United States Patent
Varatharaajan et al.

(10) Patent No.: US 11,539,407 B2
(45) Date of Patent: Dec. 27, 2022

(54) SRS CONFIGURATION AND INDICATION FOR CODEBOOK AND NON-CODEBOOK BASED UL TRANSMISSIONS IN A NETWORK

(71) Applicant: Fraunhofer-Gesellschaft zur Förderung der angewandten Forschung e.V., Munich (DE)

(72) Inventors: Sutharshun Varatharaajan, Erlangen (DE); Marcus Grossmann, Erlangen (DE); Markus Landmann, Erlangen (DE)

(73) Assignee: Fraunhofer-Gesellschaft zur Forderung der angewandten Forschung e.V.

( * ) Notice: Subject to any disclaimer, the term of this patent is extended or adjusted under 35 U.S.C. 154(b) by 0 days.

(21) Appl. No.: 17/428,213

(22) PCT Filed: Feb. 14, 2020

(86) PCT No.: PCT/EP2020/053910
§ 371 (c)(1),
(2) Date: Aug. 3, 2021

(87) PCT Pub. No.: WO2020/165413
PCT Pub. Date: Aug. 20, 2020

(65) Prior Publication Data
US 2022/0123799 A1    Apr. 21, 2022

(30) Foreign Application Priority Data

Feb. 16, 2019 (EP) .................................... 19157604

(51) Int. Cl.
*H04W 72/04* (2009.01)
*H04B 7/0456* (2017.01)
*H04L 5/00* (2006.01)

(52) U.S. Cl.
CPC ......... *H04B 7/0456* (2013.01); *H04L 5/0053* (2013.01); *H04W 72/042* (2013.01)

(58) Field of Classification Search
CPC ............. H04W 72/042; H04W 52/146; H04W 72/1289; H04W 72/04; H04W 72/1268;
(Continued)

(56) References Cited

U.S. PATENT DOCUMENTS 11,381,283 B2 *   7/2022   Shao ...................... H04L 1/1896
11,411,619 B2 *   8/2022   Liu ........................ H04L 5/0048
(Continued)

FOREIGN PATENT DOCUMENTS

EP           348113 A1       5/2019
WO    WO 2018 203728 A1    11/2018

OTHER PUBLICATIONS

International Search Report, Application No. PCT/EP2020/053910, dated Apr. 14, 2020, European Patent Office.
(Continued)

*Primary Examiner* — Eva Y Puente
(74) *Attorney, Agent, or Firm* — Burr & Forman LLP; Jeffrey H. Kamenetsky (57) ABSTRACT

The embodiments herein relate to a method performed by a network node and a network node. The method comprises setting a higher-layer parameter usage in at least one sounding reference signal, SRS, resource set configuration to nonCodebook or Codebook, wherein each configured SRS resource set comprises one or more SRS resources, and scheduling a physical uplink shared channel (PUSCH) transmission via a downlink control information (DCI) wherein at least two SRS resources are indicated via a sounding reference signal resource indicator (SRI) field of the DCI, wherein each SRS resource is associated with a different SRS resource set; and receiving from the user equipment a
(Continued)

physical uplink shared channel that is transmitted using the ports associated with the indicated SRS resources.

14 Claims, 3 Drawing Sheets

(58) Field of Classification Search
CPC ............. H04W 16/28; H04W 72/0413; H04W 72/046; H04B 7/0626; H04B 7/0456; H04B 7/0639; H04B 7/0695; H04B 7/0617; H04B 7/0632; H04B 7/0417; H04B 7/063; H04J 13/0003; H04J 13/16; H04J 11/0069
USPC ......................................................... 375/267
See application file for complete search history.

(56) References Cited

U.S. PATENT DOCUMENTS

| | | | | |
|---|---|---|---|---|
| 11,411,700 | B2* | 8/2022 | Kwak | H04W 72/04 |
| 2021/0344448 | A1* | 11/2021 | Nogami | H04L 1/1812 |

OTHER PUBLICATIONS

3GPP TSG RAN WG1 Ad-Hoc Meeting 1901, Taipei, Taiwan, Jan. 21-25, 2019, RI-1900623, Discussion on Multi-Beam Based Operations and Enhancements.

3GPP TS 38.214 v.15.4.0 (Dec. 2018), 3rd Generation Partnership Project; Technical Specification Group Radio Access Network; NR; Physical Layer Procedures for Data (Release 15).

3GPP TSG RAN WG1 Meeting AH-1901, Taipei, Taiwan Jan. 21-25, 2019, R1-1900359, 7.2.8.3—Enhancements on Multi-Beam Operation, Fraunhofer IIS, Franhofer HHI, UE Panel-Specific UL Transmission.

3GPP TS 38.331 v15.4.0 (Dec. 2018) 3rd Generation Partnership Project; Technical Specification Group Radio Access Network; NR; Radio Resource Control (RRC) Protocol Specification (Release 15).

3GPP TSG RAN WG1 Ad-Hoc Meeting 1901; Taipei, Taiwan, Jan. 21-25, 2019, R1-1900623, Agenda item: 7.2.8.3; LG Electronics, Discussion on Multi-Beam Based Operations and Enhancements.

3GPP TS 38.212 v15.4.0 (Dec. 2018) 3rd Generation Partnership Project; Technical Specification Group Radio Access Network; NR; Multiplexing and Channel Coding (Release 15).

Office Action dated Jul. 22, 2022 by the European Patent Office for European Patent App. 20 704 040.3-1213.

* cited by examiner

301 — Setting a higher-layer parameter *usage* in at least one SRS resource set configuration for a user equipment, UE, to nonCodebook or Codebook, wherein each configured SRS resource set comprises one or more SRS resources, and scheduling a physical uplink shared channel (PUSCH) transmission via a downlink control information, DCI, wherein at least two SRS resources are indicated via a sounding reference signal resource indicator, SRI, field of the DCI, wherein each SRS resource is associated with a different SRS resource set; and 302 — receiving from the UE, a physical uplink shared channel that is transmitted using the ports associated with the indicated SRS resources

SRS CONFIGURATION AND INDICATION FOR CODEBOOK AND NON-CODEBOOK BASED UL TRANSMISSIONS IN A NETWORK

CROSS-REFERENCE TO RELATED APPLICATION

This application is a national stage application, filed under 35 U.S.C. § 371, of International Patent Application No. PCT/EP2020/053910 filed on Feb. 14, 2020, and European Patent Application No. 19157604.0, filed Feb. 16, 2019, which are incorporated by reference herein in their entirety.

TECHNICAL FIELD

The present disclosure relates to the field of wireless communications, and in particular to methods and apparatuses employing sounding reference signal configurations and indication in a network system.

BACKGROUND

Uplink transmission in 3GPP Rel. 15 [1] enables precoded UL transmission in multiple ways:
  Codebook-based UL transmission: Precoder and ports of transmission indicated by the gNB
  Non-codebook-based UL transmission: Ports of transmission indicated by the gNB. Precoder decided from the measurement of downlink (DL) reference signals such as Channel State Information Reference Signals (CSI-RS) or the Synchronization Signal/Physical Broadcast Channel (SS/PBCH) block (or the Synchronization Signal Block, SSB).
  Beam-based UL transmission: Sounding reference signals (SRS) precoded with various spatial filters transmitted in the UL. A specific SRS resource is scheduled by the gNB for UL transmission. This type of UL transmission is particularly important for transmissions in frequency range 2 (FR2, frequencies above 6 GHz).
  Below is a brief description of the state of the art configuration and the procedures involved with uplink transmissions in 3GPP Rel. 15

In 3GPP Rel. 15, the user equipment (UE) is configured by the radio base station or the gNB with a number of SRS resource sets by higher layer (RRC) for uplink (UL) channel sounding [2]. Each SRS resource set contains the following parameters: a unique identifier (ID) for the SRS resource set, IDs of the SRS resources in the SRS resource set, the SRS usage (which either 'codebook', 'nonCodebook', 'beam-Management' or 'antennaSwitching'), the time-domain behavior of the SRS resource set (either 'periodic', 'aperiodic' or 'semi-persistent'), power control parameters and additional parameters pertaining to the time-domain properties of the SRS resource set.

3GPP Release 15 allows for the configuration of only one SRS resource set for a UE with the higher-layer parameter usage set to 'codebook' or 'nonCodebook' [1], per BWP in a cell for a given time-domain behavior. A maximum of 4 SRS resources can be configured in the SRS resource set when the higher-layer parameter is set to 'nonCodebook', and a maximum of 2 SRS resources can be configured for the SRS resource set when the higher-layer parameter is set to 'Codebook'.

When the SRS resource set has aperiodic time-domain behaviour, the SRS resource set is configured with aperiodic SRS trigger states. A trigger state maps the SRS resource set to an index which when indicated in the downlink control information (DCI) initiates the transmission of the SRS resource set. The trigger state may optionally also contain the CSI-RS resource to be measured by the UE to determine the precoder for the SRS resources in the SRS resource set if the higher-layer parameter usage in the SRS resource set configuration is set to 'nonCodebook'. When the SRS resource set has periodic or semi-persistent time-domain behaviour and the higher-layer parameter usage is set to 'nonCodebook', the CSI-RS resource to be measured in the downlink to determine the precoder for the SRS is configured in the higher-layer parameter 'associated-CSI-RS', which is also an optional parameter.

The individual SRS resources in the SRS resource set may be configured with SpatialRelationInfo which associates an SRS resource with a CSI-RS resource. This indicates that the spatial filter used to transmit the SRS resource shall be the same as the spatial filter used to receive the specific CSI-RS resource. It should be noted that for non-codebook SRS resource sets, the parameter associated-CSI-RS or the CSI-RS resource indication in the aperiodic trigger state are not configured for the SRS resource set if the higher-layer parameter SpatialRelationInfo is configured for the individual SRS resources.

The transmission of SRS resources of various time-domain behaviors happens as follows: Aperiodic SRS resource sets mapped to an aperiodic trigger state 'z' are transmitted when the UE receives the bit index 'z' in the 'SRS request' field in the downlink control information (DCI). A semi-persistent SRS resource set is transmitted when it is activated by a higher-layer (Medium Access Control, MAC) control element (CE) command. Periodic SRS resource sets are transmitted without triggering/activation from the gNB.

To notify the gNB of its capabilities, 3GPP Rel. 15 specifies the transmission of a higher-layer (RRC) message by the UE that details its capabilities. The UE capability parameters specifically concerning codebook- and non-codebook-based UL transmissions are the following: maxNumberMIMO-LayersCB-PUSCH (maximum number of layers that can be transmitted in a codebook-based PUSCH transmission $L_{max}^{(CB)}$) maxNumberMIMO-LayersNonCB-PUSCH (maximum number of layers that can be transmitted in a non-codebook-based PUSCH transmission $L_{max}^{(NCB)}$), maxNumberSimultaneousSRS-ResourceTx (maximum number of SRS resources that can be transmitted in one symbol for non-codebook based SRS transmission), maxNumberSRS-ResourcePerSet (maximum number of SRS resources in the SRS resource set for codebook/non-codebook based UL transmission).

A typical codebook-based uplink transmission involves the following procedures:
  The uplink reference signals for channel sounding, SRS, are configured for codebook based UL transmissions in Rel. 15 with the higher layer parameter SRS-Config [2]. The number of SRS resources and resource sets supported for sounding the UL channel are as follows:
    The number of SRS resource sets configured per time-domain behavior (value of higher-layer parameter resourceType) per BWP (bandwidth-part) in a cell for higher layer parameter usage set to 'codebook' is 1.
    A maximum of 2 SRS resources can be configured in the SRS resource set.
  The gNB triggers the transmission of the SRS resource set for UL channel sounding via a DCI trigger or a MAC- CE activation command depending on the time-domain behavior of the SRS (detailed description above).

The UE sounds the UL channel with the s resources in the SRS resource set.

The gNB indicates the SRS resource that the UE has to use for UL transmission in the SRS resource indicator (SRI) field present in DCI used for scheduling PUSCH. The precoder to be used for the UL transmission across the ports in the indicated SRS resource is given by the transmission precoding matrix indicator (TPMI) that indicates a precoder matrix from the tables specified in section 6.3.1.5 in [3].

A typical non-codebook based uplink transmission involves the following procedures:

The uplink reference signals for channel sounding, SRS, are configured for non-codebook based UL transmissions in Rel. 15 with the higher layer parameter SRS-Config [2]. The number of SRS resources and resource sets supported for sounding the UL channel are as follows:

The number of SRS resource sets configured per time-domain behavior (value of higher-layer parameter resourceType) per BWP in a cell for higher layer parameter usage of 'nonCodebook' is 1.

A maximum of 4 SRS resources can be configured in the SRS resource set.

Each SRS resource is associated with only one SRS port.

The gNB triggers the transmission of the SRS resource set (for non-codebook usage) for UL channel sounding via a DCI trigger or a MAC-CE activation command depending on the time-domain behavior of the SRS (detailed description above).

The gNB transmits the s SRS resources with the appropriate precoder as configured by the RRC parameter associated-CSI-RS or SpatialRelationInfo.

The gNB indicates the r SRS resources that the UE has to use for UL transmission in the SRI present in DCI used for scheduling PUSCH. The value r also corresponds to the rank of the transmission. The precoding of the r SRS resources is determined by associated-CSI-RS or SpatialRelationInfo. If neither parameter is configured, the precoder is determined by UE implementation.

It should be mentioned that in both codebook and non-codebook based PUSCH transmissions described above, the DCI scheduling the PUSCH indicates one or more SRS resources. The corresponding PUSCH is transmitted, by the UE, using the antenna ports corresponding to the SRS ports associated with the indicated SRS resources. The procedure of codebook and non-codebook based UL transmission in Rel. 15 is well suited for FR1 (frequencies below 6 GHz). In the case of FR2 (frequencies above 6 GHz), where the UE may be equipped with multiple panels/Tx-Rx RF chains, one faces issues with power control. To enable multi-panel transmission with independent power control among different panels, the SRS configuration of Rel. 15 has to be modified. When multiple panels are used at the UE, it would be advantageous to perform power control for the ports associated with different panels separately thereby facilitating the extension of multi-panel transmissions to more than one TRP. In Rel. 15, there is only one SRS resource set configured for codebook and non-codebook UL transmissions and the power control parameters are set per SRS resource set, thereby controlling the power distribution among all the ports with one parameter. An antenna port may be defined as a panel. Hence throughout this disclosure a panel and an antenna port are used interchangeably.

SUMMARY

According to exemplary embodiments herein, we present an SRS configuration to support multi-panel UL transmission from the UE in a way independent power control can be performed among different panels, and a method to indicate the SRS resources in the proposed configuration for UL transmission in the DCI (downlink control information) with the modified SRS configuration.

According to an aspect of some exemplary embodiments herein, there is provided a method to group SRS resources into SRS resource sets for 'codebook' and 'nonCodebook' based UL transmissions to facilitate multi-panel transmissions with flexible power control for UEs operating at e.g. frequency range 2 (FR2), the UE capability parameters that are associated with the same and a method to indicate the SRS resources to be used in the downlink control information (DCI) for PUSCH transmission based on the proposed SRS configuration. The UE capability parameter is, according to the present embodiments equal to the maximum number of SRS resource sets as will be explained.

According to an aspect of embodiments herein there is provided a method performed by a network node, the method comprising: configuring at least two SRS resource sets for a UE via a higher layer, wherein each SRS resource set comprises at least one SRS resource, and wherein the higher layer configuration of the SRS comprises a parameter usage and the value of the parameter is set to nonCodebook or Codebook. The method further comprises: scheduling at least one PUSCH transmission for said UE via a downlink control information, DCI, wherein at least two SRS resources are indicated via a sounding reference signal resource indicator (SRI) field of the DCI, wherein each SRS resource is associated with a different SRS resource set; and receiving from the UE a PUSCH that is transmitted using the ports associated with the indicated SRS resources.

There is also provided a network node comprising a processor and a memory, said memory containing instructions executable by said processor whereby said network node is operative to configure at least two sounding reference signal (SRS) resource sets for a user equipment via a higher layer, wherein each SRS resource set comprises at least one SRS resource, and wherein the higher layer configuration of the SRS comprises a parameter usage and the value of the parameter is set to nonCodebook or Codebook; schedule at least one physical uplink shared channel (PUSCH) transmission for said user equipment via a downlink control information (DCI) wherein at least two SRS resources are indicated via a sounding reference signal resource indicator (SRI) field of the DCI, wherein each SRS resource is associated with a different SRS resource set; map a given SRI bit field of the SRI field to the SRS resources indicated from associated SRS resource sets; and receive from the user equipment a PUSCH that is transmitted using antenna ports associated with the indicated SRS resources, wherein, in the case when the usage is set to codebook, the DCI indicates as many transmitted precoding matrix index (TPMI) values as the number of SRS resources indicated via the SRI field of the DCI in which a first TPMI value indicates the precoder for the antenna ports corresponding to a first SRS resource and a second TPMI value indicates the precoder for the antenna ports corresponding to a second SRS resource and so on, and wherein, in the case when the usage is set to nonCodebook, each SRS resource in the SRS resource set configuration is configured with only one port, and wherein each SRS port has a one-to-one mapping with a demodulation reference signal (DMRS) port and thereby, a transmission layer associated with said PUSCH.

There is also provided a user equipment comprising a processor and a memory, said memory containing instructions executable by said processor whereby said user equipment is operative to be configured by a network node, the network node comprising a processor and a memory, said memory containing instructions executable by said processor whereby said network node is operative to: configure at least two sounding reference signal (SRS) resource sets for the user equipment via a higher layer, wherein each SRS resource set comprises at least one SRS resource, and wherein the higher layer configuration of the SRS comprises a parameter usage and the value of the parameter is set to nonCodebook or Codebook; —schedule at least one physical uplink shared channel (PUSCH) transmission for said user equipment via a downlink control information (DCI) wherein at least two SRS resources are indicated via a sounding reference signal resource indicator (SRI) field of the DCI, wherein each SRS resource is associated with a different SRS resource set; —map a given SRI bit field of the SRI field to the SRS resources indicated from associated SRS resource sets; and —receive from the user equipment a PUSCH that is transmitted using antenna ports associated with the indicated SRS resources, —wherein, in the case when the usage is set to codebook, the DCI indicates as many transmitted precoding matrix index (TPMI) values as the number of SRS resources indicated via the SRI field of the DCI in which a first TPMI value indicates the precoder for the antenna ports corresponding to a first SRS resource and a second TPMI value indicates the precoder for the antenna ports corresponding to a second SRS resource and so on, and —wherein, in the case when the usage is set to nonCodebook, each SRS resource in the SRS resource set configuration is configured with only one port, and wherein each SRS port has a one-to-one mapping with a demodulation reference signal (DMRS) port and thereby, a transmission layer associated with said PUSCH.

There is also provided a method performed by a user equipment, the method comprising, receiving a configuration from a network node, the configuration comprising: configuring at least two sounding reference signal (SRS) resource sets for the user equipment via a higher layer, wherein each SRS resource set comprises at least one SRS resource, and wherein the higher layer configuration of the SRS comprises a parameter usage and the value of the parameter is set to nonCodebook or Codebook; scheduling at least one physical uplink shared channel (PUSCH) transmission for said user equipment via a downlink control information (DCI) wherein at least two SRS resources are indicated via a sounding reference signal resource indicator (SRI) field of the DCI, wherein each SRS resource is associated with a different SRS resource set; mapping a given SRI bit field of the SRI field to the SRS resources indicated from associated SRS resource sets; receiving from the user equipment a PUSCH that is transmitted using antenna ports associated with the indicated SRS resources; wherein, in the case when the usage is set to codebook, the DCI indicates as many transmitted precoding matrix index (TPMI) values as the number of SRS resources indicated via the SRI field of the DCI in which a first TPMI value indicates the precoder for the antenna ports corresponding to a first SRS resource and a second TPMI value indicates the precoder for the antenna ports corresponding to a second SRS resource and so on; and wherein, in the case when the usage is set to nonCodebook, each SRS resource in the SRS resource set configuration is configured with only one port, and wherein each SRS port has a one-to-one mapping with a demodulation reference signal (DMRS) port and thereby, a transmission layer associated with said PUSCH and operating according to said received configuration. There is also provided a computer program comprising instructions which when executed on at least one processor of the network cause the at least said one processor to carry out methods according to any of the features described herein.

There is also provided a carrier containing the computer program, wherein the carrier is one of a computer readable storage medium; an electronic signal, optical signal or a radio signal.

BRIEF DESCRIPTION OF THE DRAWINGS

Examples of embodiments and additional advantages of the embodiments herein are described in more detail with reference to attached drawings in which.

DETAILED DESCRIPTION

In the following, is presented a detailed description of the exemplary embodiments in conjunction with the drawings, in several scenarios, to enable easier understanding of the solution(s) described herein.

The following embodiments propose a modification of the SRS resource set configuration of the 3GPP Rel. 15 specification [2] for non-codebook- and codebook-based uplink transmissions for UEs equipped with multiple panels/Tx-Rx RF chains in order to facilitate multi-panel-based uplink transmissions employing panel-specific power control.

In accordance with some exemplary embodiments, the higher-layer parameter usage in the SRS resource set configuration is set to 'nonCodebook' or 'Codebook'. The number of SRS resource sets that can be configured per cell, BWP, and time-domain behavior is given by $N_{SRSset}^{(NCB)}$ and $N_{SRSset}^{(CB)}$, respectively. The number of configured SRS resource sets is identical to the number of either all of UE panels/Tx-Rx RF chains, or a subset of UE panels/Tx-Rx RF chains.

For example, a UE may be equipped with three panels/Tx-Rx RF chains and shall be configured with three SRS resource sets for non-codebook/codebook usage in a particular BWP with a specific time-domain behavior, such that the first SRS resource set having SRS resource set ID '100' is associated with the first panel/Tx-Rx RF chain, the second SRS resource set having SRS resource set ID '101' is associated with the second panel/Tx-Rx RF chain, and the third SRS resource set having SRS resource set ID '102' is associated with the third panel/Tx-Rx RF chain.

In another example, the UE may be equipped with three panels/Tx-RX RF chains and is configured with only two SRS resource sets for non-codebook/codebook usage in a particular BWP with a specific time-domain behavior, such that the first SRS resource set having SRS resource set ID '100' is associated with the first panel/Tx-Rx RF chain, and the second SRS resource set having SRS resource set ID '101' is associated with the second panel/Tx-Rx RF chain.

In accordance with some exemplary embodiments, any two SRS resources from two different SRS resource sets, both the SRS resource sets configured with higher-layer parameter usage set to 'nonCodebook' or 'Codebook', the same time-domain behavior and the same BWP, can be transmitted simultaneously by the UE using multiple panels/Tx-Rx RF chains. For example, an SRS resource set with SRS resource set ID '100' is configured with higher-layer parameter usage set to 'codebook' or 'nonCodebook' for a particular BWP in a cell and a particular time-domain behavior. Another SRS resource set with SRS resource set ID '101' is configured with the same value for the higher-layer parameter usage as the SRS resource set '100' and configured for the identical BWP in the same cell and the same time-domain behaviour as SRS resource set '100'. Any SRS resource from the SRS resource set '100' can be transmitted simultaneously with any SRS resource from SRS resource set '101'. This essentially means that an SRS resource set consists of SRS resources that are transmitted from a particular panel/Tx-Rx RF chain at the UE.

In accordance with some exemplary embodiments, the maximum number of SRS resource sets supported by the UE per BWP, per cell and time-domain behavior, for codebook and non-codebook-based uplink transmission, is a UE capability and defined by higher layer (RRC) parameters, e.g., "maxNumberOfSRSResourceSetsCB" ($N_{SRSset}^{(CB)}$) and "maxNumberOfSRSResourceSetsNCB" ($N_{SRSset}^{(NCB)}$). The UE capability parameters denote the maximum number of UE panels/Tx-Rx RF chains the UE supports for a particular SRS usage.

In accordance with some exemplary embodiments, each SRS resource in the SRS resource set configuration with the higher-layer parameter usage set to 'nonCodebook' is configured with only one SRS port. Each SRS port in this case has a one-to-one mapping with a demodulation reference signal (DMRS) port over which each data layer is transmitted. Hence, the number of SRS resources indicated in the PUSCH-scheduling DCI for non-codebook-based UL transmission automatically determines the maximum number of MIMO layers to be transmitted by the UE in the physical uplink shared channel (PUSCH).

In the following, indication of SRS resources for PUSCH (physical uplink shared channel) transmission is presented in according with some embodiments herein.

In accordance with some exemplary embodiments, for non-codebook-based PUSCH transmission, the PUSCH-scheduling DCI indicates up to $L_{max}^{(NCB)}$ SRS resources for PUSCH transmission in the SRS resource indicator (SRI) field.

In accordance with some exemplary embodiments, for codebook-based PUSCH transmission, the PUSCH-scheduling DCI indicates up to $N_{max,SRSset}^{(CB)}$ SRS resources in the SRI field. The value of $N_{max,SRSres}^{(CB)}$ is a UE capability and defined by a higher-layer (RRC) parameter, e.g., "maxSimultSRSResourcesTxCBUL".

In accordance with some exemplary embodiments, each SRS resource indicated in the SRI field of the PUSCH-scheduling-DCI for codebook or non-codebook-based PUSCH transmission is chosen from different SRS resource sets. For example, the SRI in the PUSCH-scheduling DCI indicates 3 SRS resources for PUSCH transmission. The first SRS resource indicated in the SRI belongs to the SRS resource set with SRS resource set ID '100' configured with higher-layer parameter usage set to 'codebook' or 'non-Codebook' for a particular BWP in a cell and a particular time-domain behavior. The second SRS resource indicated in the SRI belongs to the SRS resource set having SRS resource set ID '101' configured with the same value for the higher-layer parameter usage, identical BWP in the same cell and the same time-domain behavior as SRS resource set '100'. The third SRS resource indicated in the SRI belongs to the SRS resource set having SRS resource set ID '102' configured with the same value for the higher-layer parameter usage, identical BWP in the same cell and the same time-domain behavior as SRS resource set '100'.

In accordance with some exemplary embodiments, the SRS resource sets from which the SRI field in the PUSCH-scheduling DCI indicates the SRS resources for PUSCH transmission are called reference SRS resource sets.

Figure 1:
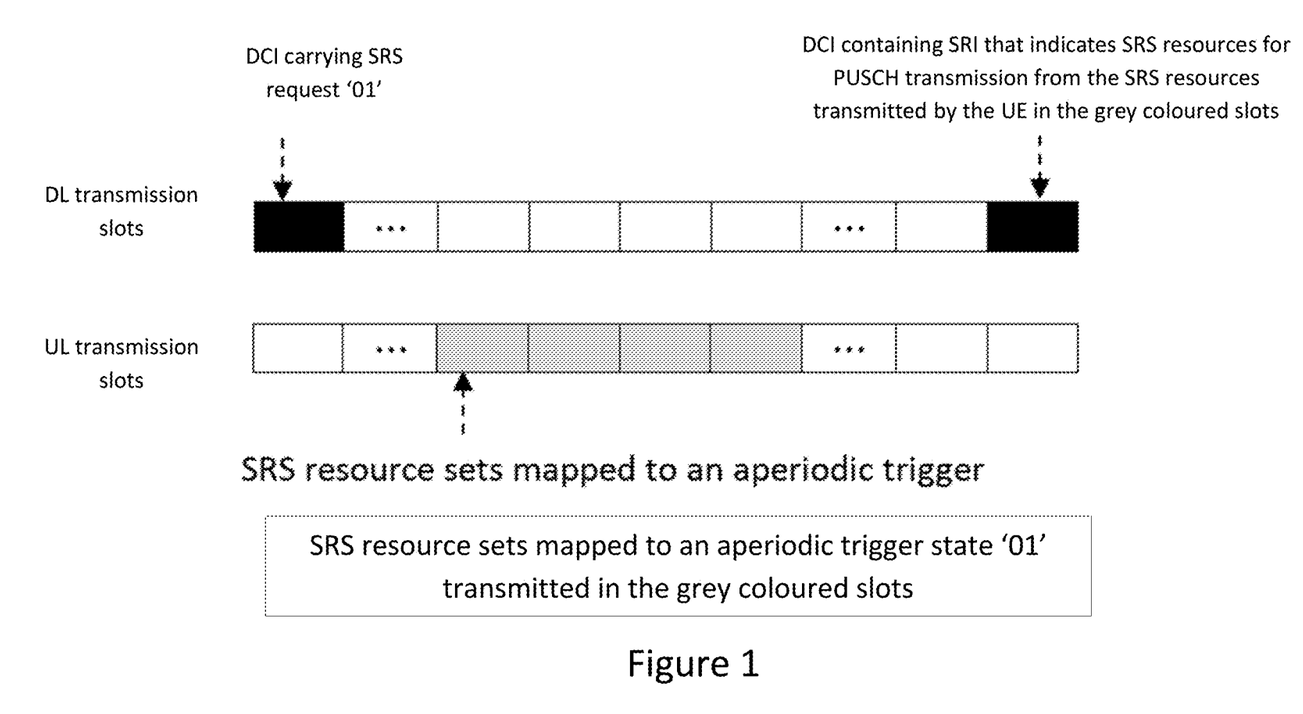
FIG. 1 shows reference SRS resource sets in the case of aperiodic SRS resource sets.

In accordance with embodiments, in the case of aperiodic SRS transmission, the reference SRS resource sets are the SRS resource sets transmitted after the most recent DCI carrying the SRS request triggering the aperiodic resource sets, see FIG. 1.

FIG. 1 illustrates the downlink (DL) and uplink (UL) transmission slots. FIG. 1 also shows the DCI (downlink control information) containing SRI that indicates SRS resources for PUSCH transmission from the SRS resources transmitted by the UE (grey coloured slots). The SRS resource sets mapped to an aperiodic trigger state '01' transmitted are in the grey coloured slots. The DCI carrying SRS '01' is also shown.

In accordance with some exemplary embodiments, in the case of semi-persistent SRS transmission, the reference SRS resource sets for the SRI of the PUSCH-scheduling DCI in transmission slot n are all the semi-persistent SRS resource sets that were not deactivated by a MAC control element command before n-k slots, where k is a constant value.

In accordance with embodiments, in the case of periodic SRS transmission, the indicated SRS resources in the SRI (SRS resource indicator (SRI)) field of the PUSCH-scheduling DCI are the periodic SRS resource sets configured by the higher-layer for the BWP (bandwidth-part) associated with the DCI.

In accordance with the embodiments, only the SRS resources that belong to the reference SRS resource set(s) is/are indicated in the SRI field of the PUSCH-scheduling DCI.

Let the number of reference SRS resource sets be $N_{SRSset,Tx}^{(NCB)}$ for non-codebook-based SRS and $N_{SRSset,Tx}^{(CB)}$ for codebook-based SRS. The values of $N_{SRSset,Tx}^{(CB)}$ and $N_{SRSset,Tx}^{(NCB)}$ satisfy the following inequalities: $N_{SRSset,Tx}^{(CB)} \leq N_{SRSset}^{(CB)}$ and $N_{SRSset,Tx}^{(NCB)} \leq N_{SRSset}^{(NCB)}$.

In accordance with some exemplary embodiments, Tables 1-6 below provide a mapping of a given SRI bit field to the SRS resources indicated from the associated SRS resource sets.

TABLE 1

SRI indices and indicated SRS resource(s) for when $N_{SRSset,Tx}^{(NCB)} = 2$, NSRSres(NCB) = 1 for NCB UL transmissions and $N_{SRSset,Tx}^{(CB)} = 2$, $N_{SRSres}^{(CB)} = 1$ for CB UL transmissions.

| SRI Bit field mapped to index | SRS resource(s) indicated for NCB ($L_{max}^{(NCB)} = 1$) ($N_{max, SRSres}^{(CB)} = 1$) | SRI Bit field mapped to index | SRS resource(s) indicated for NCB ($L_{max}^{(NCB)} = 2$) and CB UL ($N_{max, SRSres}^{(CB)} = 2$) |
|---|---|---|---|
| 0 | $S_0^0$ | 0 | $S_0^0$ |
| 1 | $S_0^1$ | 1 | $S_0^1$ |
|  |  | 2 | $S_0^0$, $S_0^1$ |
|  |  | 3 | reserved |

TABLE 2

SRI indices and indicated SRS resource(s) for when $N_{SRSset, Tx}^{(NCB)} = 2$, $N_{SRSres}^{(NCB)} = 2$ transmissions and $N_{SRSset, Tx}^{(CB)} = 2$, $N_{SRSres}^{(CB)} = 2$ for CB UL transmissions.

| SRI Bit field mapped to index | SRS resource(s) indicated for NCB ($L_{max}^{(NCB)} = 1$) and CB UL ($N_{max, SRSres}^{(CB)} = 1$) | SRI Bitfield mapped to index | SRS resource(s) indicated for NCB ($L_{max}^{(NCB)} = 2$) and CB UL ($N_{max, SRSres}^{(CB)} = 2$) |
|---|---|---|---|
| 0 | $S_0^0$ | 0 | $S_0^0$ |
| 1 | $S_1^0$ | 1 | $S_1^0$ |
| 2 | $S_0^1$ | 2 | $S_0^1$ |
| 3 | $S_1^1$ | 3 | $S_1^1$ |
|   |   | 4 | $S_0^0, S_0^1$ |
|   |   | 5 | $S_0^0, S_1^1$ |
|   |   | 6 | $S_1^0, S_0^1$ |
|   |   | 7 | $S_1^0, S_1^1$ |

TABLE 3

SRI indices and indicated SRS resource(s) for when $N_{SRSset, Tx}^{(NCB)} = 3$, $N_{SRSres}^{(NCB)} = 1$ for NCB UL transmissions and $N_{SRSset, Tx}^{(CB)} = 3$, $N_{SRSres}^{(CB)} = 1$ for CB UL transmissions.

| SRI Bit field mapped to index | SRS resource(s) indicated for NCB ($L_{max}^{(NCB)} = 1$) and CB UL ($N_{max, SRSres}^{(CB)} = 1$) | SRI Bit field mapped to index | SRS resource(s) indicated for NCB ($L_{max}^{(NCB)} = 2$) and CB UL ($N_{max, SRSres}^{(CB)} = 2$) | SRI Bit field mapped to index | SRS resource(s) indicated for NCB ($L_{max}^{(NCB)} = 3$) and CB UL ($N_{max, SRSres}^{(CB)} = 3$) |
|---|---|---|---|---|---|
| 0 | $S_0^0$ | 0 | $S_0^0$ | 0 | $S_0^0$ |
| 1 | $S_0^1$ | 1 | $S_0^1$ | 1 | $S_0^1$ |
| 2 | $S_0^2$ | 2 | $S_0^2$ | 2 | $S_0^2$ |
| 3 | reserved | 3 | $S_0^0, S_0^1$ | 3 | $S_0^0, S_0^1$ |
|   |   | 4 | $S_0^0, S_0^2$ | 4 | $S_0^0, S_0^2$ |
|   |   | 5 | $S_0^1, S_0^2$ | 5 | $S_0^1, S_0^2$ |
|   |   | 6-7 | reserved | 6 | $S_0^0, S_0^1, S_0^2$ |
|   |   |   |   | 7 | reserved |

TABLE 4

SRI indices and indicated SRS resource(s) for when $N_{SRSset, Tx}^{(NCB)} = 3$, $N_{SRSres}^{(NCB)} = 2$ for NCB UL transmissions and $N_{SRSset, Tx}^{(CB)} = 3$, $N_{SRSres}^{(CB)} = 2$ for CB UL transmissions.

| SRI Bit field mapped to index | SRS resource(s) indicated for NCB ($L_{max}^{(CB)} = 1$) and CB UL ($N_{max, SRSres}^{(CB)} = 1$) | SRI Bit field mapped to index | SRS resource(s) indicated for NCB ($L_{max}^{(CB)} = 2$) and CB UL ($N_{max, SRSres}^{(CB)} = 2$) | SRI Bit field mapped to index | SRS resource(s) indicated for NCB ($L_{max}^{(CB)} = 3$) and CB UL ($N_{max, SRSres}^{(CB)} = 3$) |
|---|---|---|---|---|---|
| 0 | $S_0^0$ | 0 | $S_0^0$ | 0 | $S_0^0$ |
| 1 | $S_0^1$ | 1 | $S_0^1$ | 1 | $S_0^1$ |
| 2 | $S_0^2$ | 2 | $S_0^2$ | 2 | $S_0^2$ |
| 3 | $S_1^0$ | 3 | $S_1^0$ | 3 | $S_1^0$ |
| 4 | $S_1^1$ | 4 | $S_1^1$ | 4 | $S_1^1$ |
| 5 | $S_1^2$ | 5 | $S_1^2$ | 5 | $S_1^2$ |
| 6-7 | reserved | 6 | $S_0^0, S_1^1$ | 6 | $S_0^0, S_1^1$ |
|   |   | 7 | $S_0^0, S_0^2$ | 7 | $S_0^0, S_0^2$ |
|   |   | 8 | $S_0^1, S_0^2$ | 8 | $S_0^1, S_0^2$ |
|   |   | 9 | $S_0^0, S_1^1$ | 9 | $S_0^0, S_1^1$ |
|   |   | 10 | $S_0^0, S_1^2$ | 10 | $S_0^0, S_1^2$ |
|   |   | 11 | $S_0^1, S_1^1$ | 11 | $S_0^1, S_1^1$ |
|   |   | 12 | $S_1^1, S_1^2$ | 12 | $S_1^1, S_1^2$ |

TABLE 4-continued

SRI indices and indicated SRS resource(s) for when $N_{SRSset, Tx}^{(NCB)} = 3$, $N_{SRSres}^{(NCB)} = 2$ for NCB UL transmissions and $N_{SRSset, Tx}^{(CB)} = 3$, $N_{SRSres}^{(CB)} = 2$ for CB UL transmissions.

| SRI Bit field mapped to index | SRS resource(s) indicated for NCB and CB UL ($L_{max}^{(CB)} = 1$) ($N_{max, SRSres}^{(CB)} = 1$) | SRI Bit field mapped to index | SRS resource(s) indicated for NCB and CB UL ($L_{max}^{(CB)} = 2$) ($N_{max, SRSres}^{(CB)} = 2$) | SRI Bit field mapped to index | SRS resource(s) indicated for NCB and CB UL ($L_{max}^{(CB)} = 3$) ($N_{max, SRSres}^{(CB)} = 3$) |
|---|---|---|---|---|---|
| | | 13-15 | reserved | 13 | $S_0^0$, $S_0^1$, $S_0^2$ |
| | | | | 14 | $S_0^0$, $S_0^1$, $S_1^2$ |
| | | | | 15 | $S_0^0$, $S_1^1$, $S_0^2$ |
| | | | | 16 | $S_0^0$, $S_1^1$, $S_1^2$ |
| | | | | 17 | $S_1^0$, $S_0^1$, $S_0^2$ |
| | | | | 18 | $S_1^0$, $S_0^1$, $S_1^2$ |
| | | | | 19 | $S_1^0$, $S_1^1$, $S_0^2$ |
| | | | | 20 | $S_1^0$, $S_1^1$, $S_1^2$ |
| | | | | 21-32 | reserved |

TABLE 5

SRI indices and indicated SRS resource(s) for when $N_{SRSset, Tx}^{(NCB)} = 4$, $N_{SRSres}^{(NCB)} = 1$ for NCB UL transmissions and $N_{SRSset, Tx}^{(CB)} = 4$, $N_{SRSres}^{(CB)} = 1$ for CB UL transmissions.

| SRI Bit field mapped to index | SRS resource(s) indicated for NCB and CB UL ($L_{max}^{(NCB)} = 1$) ($N_{max, SRSres}^{(CB)} = 1$) | SRI Bit field mapped to index | SRS resource(s) indicated for NCB and CB UL ($L_{max}^{(NCB)} = 2$) ($N_{max, SRSres}^{(CB)} = 2$) | SRI Bit field mapped to index | SRS resource(s) indicated for NCB and CB UL ($L_{max}^{(NCB)} = 3$) ($N_{max, SRSres}^{(CB)} = 3$) | SRI Bit field mapped to index | SRS resource(s) indicated for NCB and CB UL ($L_{max}^{(NCB)} = 4$) ($N_{max, SRSres}^{(CB)} = 4$) |
|---|---|---|---|---|---|---|---|
| 0 | $S_0^0$ | 0 | $S_0^0$ | 0 | $S_0^0$ | 0 | $S_0^0$ |
| 1 | $S_0^1$ | 1 | $S_0^1$ | 1 | $S_0^1$ | 1 | $S_0^1$ |
| 2 | $S_0^2$ | 2 | $S_0^2$ | 2 | $S_0^2$ | 2 | $S_0^2$ |
| 3 | $S_0^3$ | 3 | $S_0^3$ | 3 | $S_0^3$ | 3 | $S_0^3$ |
| | | 4 | $S_0^0$, $S_0^1$ | 4 | $S_0^0$, $S_0^1$ | 4 | $S_0^0$, $S_0^1$ |
| | | 5 | $S_0^0$, $S_0^2$ | 5 | $S_0^0$, $S_0^2$ | 5 | $S_0^0$, $S_0^2$ |
| | | 6 | $S_0^0$, $S_0^3$ | 6 | $S_0^0$, $S_0^3$ | 6 | $S_0^0$, $S_0^3$ |
| | | 7 | $S_0^1$, $S_0^2$ | 7 | $S_0^1$, $S_0^2$ | 7 | $S_0^1$, $S_0^2$ |
| | | 8 | $S_0^1$, $S_0^3$ | 8 | $S_0^1$, $S_0^3$ | 8 | $S_0^1$, $S_0^3$ |
| | | 9 | $S_0^2$, $S_0^3$ | 9 | $S_0^2$, $S_0^3$ | 9 | $S_0^2$, $S_0^3$ |
| | | 10-15 | reserved | 10 | $S_0^0$, $S_0^1$, $S_0^2$ | 10 | $S_0^0$, $S_0^1$, $S_0^2$ |
| | | | | 11 | $S_0^0$, $S_0^1$, $S_0^3$ | 11 | $S_0^0$, $S_0^1$, $S_0^3$ |
| | | | | 12 | $S_0^0$, $S_0^2$, $S_0^3$ | 12 | $S_0^0$, $S_0^2$, $S_0^3$ |

TABLE 5-continued

SRI indices and indicated SRS resource(s) for when $N_{SRSset, TX}^{(NCB)} = 4$, $N_{SRSres}^{(NCB)} = 1$ for NCB UL transmissions and $N_{SRSset, Tx}^{(CB)} = 4$, $N_{SRSres}^{(CB)} = 1$ for CB UL transmissions.

| SRI Bit field mapped to index | SRS resource(s) indicated for NCB ($L_{max}^{(NCB)} = 1$) and CB UL ($N_{max, SRSres}^{(CB)} = 1$) | SRI Bit field mapped to index | SRS resource(s) indicated for NCB ($L_{max}^{(NCB)} = 2$) and CB UL ($N_{max, SRSres}^{(CB)} = 2$) | SRI Bit field mapped to index | SRS resource(s) indicated for NCB ($L_{max}^{(NCB)} = 3$) and CB UL ($N_{max, SRSres}^{(CB)} = 3$) | SRI Bit field mapped to index | SRS resource(s) indicated for NCB ($L_{max}^{(NCB)} = 4$) and CB UL ($N_{max, SRSres}^{(CB)} = 4$) |
|---|---|---|---|---|---|---|---|
| | | | | 13 | $S_0^1$, $S_0^2$, $S_0^3$ | 13 | $S_0^1$, $S_0^2$, $S_0^3$ |
| | | | | 14-15 | reserved | 14 | $S_0^0$, $S_0^1$, $S_0^2$, $S_0^3$ |
| | | | | | | 15 | reserved |

TABLE 6

SRI indices and indicated SRS resource(s) for when $N_{SRSset, Tx}^{(NCB)} = 4$, $N_{SRSres}^{(NCB)} = 2$ for NCB UL transmissions and $N_{SRSset, Tx}^{(NCB)} = 4$, $N_{SRSset, Tx}^{(CB)} = 2$ for CB UL transmissions.

| SRI Bit field mapped to index | SRS resource(s) indicated for NCB ($L_{max}^{(NCB)} = 1$) and CB UL ($N_{max, SRSres}^{(CB)} = 1$) | SRI Bit field mapped to index | SRS resource(s) indicated for NCB ($L_{max}^{(NCB)} = 2$) and CB UL ($N_{max, SRSres}^{(CB)} = 2$) | SRI Bit field mapped to index | SRS resource(s) indicated for NCB ($L_{max}^{(NCB)} = 3$) and CB UL ($N_{max, SRSres}^{(CB)} = 3$) | SRI Bit field mapped to index | SRS resource(s) indicated for NCB ($L_{max}^{(NCB)} = 4$) and CB UL ($N_{max, SRSres}^{(CB)} = 4$) |
|---|---|---|---|---|---|---|---|
| 0 | $S_0^0$ | 0 | $S_0^0$ | 0 | $S_0^0$ | 0 | $S_0^0$ |
| 1 | $S_0^1$ | 1 | $S_0^1$ | 1 | $S_0^1$ | 1 | $S_0^1$ |
| 2 | $S_0^2$ | 2 | $S_0^2$ | 2 | $S_0^2$ | 2 | $S_0^2$ |
| 3 | $S_0^3$ | 3 | $S_0^3$ | 3 | $S_0^3$ | 3 | $S_0^3$ |
| 4 | $S_1^0$ | 4 | $S_1^0$ | 4 | $S_1^0$ | 4 | $S_1^0$ |
| 5 | $S_1^1$ | 5 | $S_1^1$ | 5 | $S_1^1$ | 5 | $S_1^1$ |
| 6 | $S_1^2$ | 6 | $S_1^2$ | 6 | $S_1^2$ | 6 | $S_1^2$ |
| 7 | $S_1^3$ | 7 | $S_1^3$ | 7 | $S_1^3$ | 7 | $S_1^3$ |
| | | 8 | $S_0^0$, $S_0^1$ | 8 | $S_0^0$, $S_0^1$ | 8 | $S_0^0$, $S_0^1$ |
| | | 9 | $S_0^0$, $S_1^1$ | 9 | $S_0^0$, $S_1^1$ | 9 | $S_0^0$, $S_1^1$ |
| | | 10 | $S_1^0$, $S_0^1$ | 10 | $S_1^0$, $S_0^1$ | 10 | $S_1^0$, $S_0^1$ |
| | | 11 | $S_1^0$, $S_1^1$ | 11 | $S_1^0$, $S_1^1$ | 11 | $S_1^0$, $S_1^1$ |
| | | 12 | $S_0^0$, $S_0^2$ | 12 | $S_0^0$, $S_0^2$ | 12 | $S_0^0$, $S_0^2$ |
| | | 13 | $S_0^0$, $S_1^2$ | 13 | $S_0^0$, $S_1^2$ | 13 | $S_0^0$, $S_1^2$ |
| | | 14 | $S_1^0$, $S_0^2$ | 14 | $S_1^0$, $S_0^2$ | 14 | $S_1^0$, $S_0^2$ |
| | | 15 | $S_1^0$, $S_1^2$ | 15 | $S_1^0$, $S_1^2$ | 15 | $S_1^0$, $S_1^2$ |
| | | 16 | $S_0^0$, $S_0^3$ | 16 | $S_0^0$, $S_0^3$ | 16 | $S_0^0$, $S_0^3$ |
| | | 17 | $S_0^0$, $S_1^3$ | 17 | $S_0^0$, $S_1^3$ | 17 | $S_0^0$, $S_1^3$ |
| | | 18 | $S_1^0$, $S_0^3$ | 18 | $S_1^0$, $S_0^3$ | 18 | $S_1^0$, $S_0^3$ |
| | | 19 | $S_1^0$, $S_1^3$ | 19 | $S_1^0$, $S_1^3$ | 19 | $S_1^0$, $S_1^3$ |
| | | 20 | $S_0^1$, $S_0^2$ | 20 | $S_0^1$, $S_0^2$ | 20 | $S_0^1$, $S_0^2$ |
| | | 21 | $S_0^1$, $S_1^2$ | 21 | $S_0^1$, $S_1^2$ | 21 | $S_0^1$, $S_1^2$ |
| | | 22 | $S_1^1$, $S_0^2$ | 22 | $S_1^1$, $S_0^2$ | 22 | $S_1^1$, $S_0^2$ |
| | | 23 | $S_1^1$, $S_1^2$ | 23 | $S_1^1$, $S_1^2$ | 23 | $S_1^1$, $S_1^2$ |
| | | 24 | $S_0^1$, $S_0^3$ | 24 | $S_0^1$, $S_0^3$ | 24 | $S_0^1$, $S_0^3$ |

TABLE 6-continued

SRI indices and indicated SRS resource(s) for when $N_{SRSset,Tx}^{(NCB)} = 4$, $N_{SRSres}^{(NCB)} = 2$ for NCB UL transmissions and $N_{SRSset,Tx}^{(NCB)} = 4$, $N_{SRSset,Tx}^{(CB)} = 2$ for CB UL transmissions.

| SRI Bit field mapped to index | SRS resource(s) indicated for NCB ($L_{max}^{(NCB)} = 1$) and CB UL ($N_{max,SRSres}^{(CB)} = 1$) | SRI Bit field mapped to index | SRS resource(s) indicated for NCB ($L_{max}^{(NCB)} = 2$) and CB UL ($N_{max,SRSres}^{(CB)} = 2$) | SRI Bit field mapped to index | SRS resource(s) indicated for NCB ($L_{max}^{(NCB)} = 3$) and CB UL ($N_{max,SRSres}^{(CB)} = 3$) | SRI Bit field mapped to index | SRS resource(s) indicated for NCB ($L_{max}^{(NCB)} = 4$) and CB UL ($N_{max,SRSres}^{(CB)} = 4$) |
|---|---|---|---|---|---|---|---|
| | | 25 | $S_0^1, S_1^3$ | 25 | $S_0^1, S_1^3$ | 25 | $S_0^1, S_1^3$ |
| | | 26 | $S_1^1, S_0^3$ | 26 | $S_1^1, S_0^3$ | 26 | $S_1^1, S_0^3$ |
| | | 27 | $S_1^1, S_1^3$ | 27 | $S_1^1, S_1^3$ | 27 | $S_1^1, S_1^3$ |
| | | 28 | $S_0^2, S_0^3$ | 28 | $S_0^2, S_0^3$ | 28 | $S_0^2, S_0^3$ |
| | | 29 | $S_0^2, S_1^3$ | 29 | $S_0^2, S_1^3$ | 29 | $S_0^2, S_1^3$ |
| | | 30 | $S_1^2, S_0^3$ | 30 | $S_1^2, S_0^3$ | 30 | $S_1^2, S_0^3$ |
| | | 31 | $S_1^2, S_1^3$ | 31 | $S_1^2, S_1^3$ | 31 | $S_1^2, S_1^3$ |
| | | | | 32 | $S_0^0, S_0^1, S_0^2$ | 32 | $S_0^0, S_0^1, S_0^2$ |
| | | | | 33 | $S_0^0, S_0^1, S_1^2$ | 33 | $S_0^0, S_0^1, S_1^2$ |
| | | | | 34 | $S_0^0, S_1^1, S_0^2$ | 34 | $S_0^0, S_1^1, S_0^2$ |
| | | | | 35 | $S_0^0, S_1^1, S_1^2$ | 35 | $S_0^0, S_1^1, S_1^2$ |
| | | | | 36 | $S_1^0, S_0^1, S_0^2$ | 36 | $S_1^0, S_0^1, S_0^2$ |
| | | | | 37 | $S_1^0, S_0^1, S_1^2$ | 37 | $S_1^0, S_0^1, S_1^2$ |
| | | | | 38 | $S_1^0, S_1^1, S_0^2$ | 38 | $S_1^0, S_1^1, S_0^2$ |
| | | | | 39 | $S_1^0, S_1^1, S_1^2$ | 39 | $S_1^0, S_1^1, S_1^2$ |
| | | | | 40 | $S_0^0, S_0^1, S_0^3$ | 40 | $S_0^0, S_0^1, S_0^3$ |
| | | | | 41 | $S_0^0, S_0^1, S_1^3$ | 41 | $S_0^0, S_0^1, S_1^3$ |
| | | | | 42 | $S_0^0, S_1^1, S_0^3$ | 42 | $S_0^0, S_1^1, S_0^3$ |
| | | | | 43 | $S_0^0, S_1^1, S_1^3$ | 43 | $S_0^0, S_1^1, S_1^3$ |
| | | | | 44 | $S_1^0, S_0^1, S_0^3$ | 44 | $S_1^0, S_0^1, S_0^3$ |
| | | | | 45 | $S_1^0, S_0^1, S_1^3$ | 45 | $S_1^0, S_0^1, S_1^3$ |
| | | | | 46 | $S_1^0, S_1^1, S_0^3$ | 46 | $S_1^0, S_1^1, S_0^3$ |
| | | | | 47 | $S_1^0, S_1^1, S_1^3$ | 47 | $S_1^0, S_1^1, S_1^3$ |
| | | | | 48 | $S_0^0, S_0^2, S_0^3$ | 48 | $S_0^0, S_0^2, S_0^3$ |
| | | | | 49 | $S_0^0, S_0^2, S_1^3$ | 49 | $S_0^0, S_0^2, S_1^3$ |

TABLE 6-continued

SRI indices and indicated SRS resource(s) for when $N_{SRSset,Tx}^{(NCB)} = 4$, $N_{SRSres}^{(NCB)} = 2$ for NCB UL transmissions and $N_{SRSset,Tx}^{(NCB)} = 4$, $N_{SRSset,Tx}^{(CB)} = 2$ for CB UL transmissions.

| SRI Bit field mapped to index | SRS resource(s) indicated for NCB ($L_{max}^{(NCB)} = 1$) and CB UL ($N_{max,SRSres}^{(CB)} = 1$) | SRI Bit field mapped to index | SRS resource(s) indicated for NCB ($L_{max}^{(NCB)} = 2$) and CB UL ($N_{max,SRSres}^{(CB)} = 2$) | SRI Bit field mapped to index | SRS resource(s) indicated for NCB ($L_{max}^{(NCB)} = 3$) and CB UL ($N_{max,SRSres}^{(CB)} = 3$) | SRI Bit field mapped to index | SRS resource(s) indicated for NCB ($L_{max}^{(NCB)} = 4$) and CB UL ($N_{max,SRSres}^{(CB)} = 4$) |
|---|---|---|---|---|---|---|---|
| | | | | 50 | $S_0^0, S_1^2, S_0^3$ | 50 | $S_0^0, S_1^2, S_0^3$ |
| | | | | 51 | $S_0^0, S_1^2, S_1^3$ | 51 | $S_0^0, S_1^2, S_1^3$ |
| | | | | 52 | $S_1^0, S_0^2, S_0^3$ | 52 | $S_1^0, S_0^2, S_0^3$ |
| | | | | 53 | $S_1^0, S_0^2, S_1^3$ | 53 | $S_1^0, S_0^2, S_1^3$ |
| | | | | 54 | $S_1^0, S_1^2, S_0^3$ | 54 | $S_1^0, S_1^2, S_0^3$ |
| | | | | 55 | $S_1^0, S_1^2, S_1^3$ | 55 | $S_1^0, S_1^2, S_1^3$ |
| | | | | 56 | $S_0^1, S_0^2, S_0^3$ | 56 | $S_0^1, S_0^2, S_0^3$ |
| | | | | 57 | $S_0^1, S_0^2, S_1^3$ | 57 | $S_0^1, S_0^2, S_1^3$ |
| | | | | 58 | $S_0^1, S_1^2, S_0^3$ | 58 | $S_0^1, S_1^2, S_0^3$ |
| | | | | 59 | $S_0^1, S_1^2, S_1^3$ | 59 | $S_0^1, S_1^2, S_1^3$ |
| | | | | 60 | $S_1^1, S_0^2, S_0^3$ | 60 | $S_1^1, S_0^2, S_0^3$ |
| | | | | 61 | $S_1^1, S_0^2, S_1^3$ | 61 | $S_1^1, S_0^2, S_1^3$ |
| | | | | 62 | $S_1^1, S_1^2, S_0^3$ | 62 | $S_1^1, S_1^2, S_0^3$ |
| | | | | 63 | $S_1^1, S_1^2, S_1^3$ | 63 | $S_1^1, S_1^2, S_1^3$ |
| | | | | | | 64 | $S_0^0, S_0^1, S_0^2, S_0^3$ |
| | | | | | | 65 | $S_0^0, S_0^1, S_0^2, S_1^3$ |
| | | | | | | 66 | $S_0^0, S_0^1, S_1^2, S_0^3$ |
| | | | | | | 67 | $S_0^0, S_0^1, S_1^2, S_1^3$ |
| | | | | | | 68 | $S_0^0, S_1^1, S_0^2, S_0^3$ |
| | | | | | | 69 | $S_0^0, S_1^1, S_0^2, S_1^3$ |
| | | | | | | 70 | $S_0^0, S_1^1,$ |

TABLE 6-continued

SRI indices and indicated SRS resource(s) for when $N_{SRSset,Tx}^{(NCB)} = 4$, $N_{SRSres}^{(NCB)} = 2$ for NCB UL transmissions and $N_{SRSset,Tx}^{(NCB)} = 4$, $N_{SRSset,Tx}^{(CB)} = 2$ for CB UL transmissions.

| SRI Bit field mapped to index | SRS resource(s) indicated for NCB ($L_{max}^{(NCB)} = 1$) and CB UL ($N_{max,SRSres}^{(CB)} = 1$) | SRI Bit field mapped to index | SRS resource(s) indicated for NCB ($L_{max}^{(NCB)} = 2$) and CB UL ($N_{max,SRSres}^{(CB)} = 2$) | SRI Bit field mapped to index | SRS resource(s) indicated for NCB ($L_{max}^{(NCB)} = 3$) and CB UL ($N_{max,SRSres}^{(CB)} = 3$) | SRI Bit field mapped to index | SRS resource(s) indicated for NCB ($L_{max}^{(NCB)} = 4$) and CB UL ($N_{max,SRSres}^{(CB)} = 4$) |
|---|---|---|---|---|---|---|---|
| | | | | | | 71 | $s_1^2, s_0^3, s_0^0, s_1^1, s_1^2, s_1^3$ |
| | | | | | | 72 | $s_1^0, s_0^1, s_0^2, s_0^3$ |
| | | | | | | 73 | $s_1^0, s_0^1, s_0^2, s_1^3$ |
| | | | | | | 74 | $s_1^0, s_0^1, s_1^2, s_0^3$ |
| | | | | | | 75 | $s_1^0, s_0^1, s_1^2, s_1^3$ |
| | | | | | | 76 | $s_1^0, s_1^1, s_0^2, s_0^3$ |
| | | | | | | 77 | $s_1^0, s_1^1, s_0^2, s_1^3$ |
| | | | | | | 78 | $s_1^0, s_1^1, s_1^2, s_0^3$ |
| | | | | | | 79 | $s_1^0, s_1^1, s_1^2, s_1^3$ |
| | | | | | | 80-127 | reserve |

In the Tables above, the notation $s_i^j$ denotes the i-th SRS resource of the j-th reference SRS resource set. For non-codebook based SRS, the values of i and j are given by $i=0, \ldots, N_{SRSres}^{(NCB)}-1$ and $j=0, \ldots, N_{SRSset,Tx}^{(NCB)}-1$, respectively. For codebook-based SRS, the values of i and j are given by $i=0, \ldots, N_{SRSres}^{(CB)}-1$ and $j=0, \ldots, N_{SRSset,Tx}^{(CB)}-1$, respectively. For the purpose of indication with the SRI as shown in Tables 1-6, the SRS resource sets in the reference SRS resource sets are ordered in ascending order based on the SRS resource set ID and are indexed from $0, \ldots, N_{SRSset,Tx}^{(NCB)}-1$ and $0, \ldots, N_{SRSset,Tx}^{(CB)}-1$ for non-codebook based SRS and codebook based SRS, respectively. Similarly, the SRS resources in each SRS resource set are ordered in ascending order based on the SRS resource ID and are indexed from $0, \ldots, N_{SRSres}^{(NCB)}-1$ and $0, \ldots, N_{SRSres}^{(CB)}-1$ for non-codebook based SRS and codebook based SRS, respectively. For example, there are 3 SRS resource sets that act as reference SRS resource sets with SRS resource set ID values '100', '102' and '103'. The notation $s_i^0$ denotes the i-th resource in SRS resource set '100', $s_i^1$ denotes the i-th resource in SRS resource set '102', and $s_i^2$ denotes the i-th resource in SRS resource set '103'.

Hence, the notation $s_i^j$ denotes the i-th SRS resource of the j-th reference SRS resource set, wherein $L_{max}^{(NCB)}$ is the value of the UE capability parameter 'maxNumberMIMO-LayersNonCB-PUSCH' defined in 3GPP Rel. 15, and for non-codebook based SRS, the values of i and j are given by $i=0, \ldots, N_{SRSres}^{(NCB)}-1$ and $j=0, \ldots, N_{SRSset,Tx}^{(NCB)}-1$, respectively, wherein $N_{SRSset,Tx}^{(NCB)}$ is the number of reference SRS resource sets. For codebook-based SRS, the values of i and j are given by $i=0, \ldots, N_{SRSres}^{(CB)}-1$ and $j=0, \ldots, N_{SRSset,Tx}^{(CB)}-1$, respectively, wherein $N_{SRSset,Tx}^{(CB)}$ is the number of reference SRS resource sets.

In accordance with exemplary embodiments, the number of bits of the SRI field required to indicate a maximum of $L_{max}^{(NCB)}$ resources from $N_{SRSset,Tx}^{(NCB)}$ non-codebook-based SRS resource sets is $$\left\lceil \log_2\left(\sum_{n=1}^{L_{max}^{(NCB)}} \binom{N_{SRSset,Tx}^{(NCB)}}{n} \cdot (N_{SRSres}^{(NCB)})^n\right) \right\rceil,$$

and a maximum of $N_{max,SRSres}^{(CB)}$ resources from $N_{SRSset,Tx}^{(CB)}$ codebook-based SRS resource sets is $$\left\lceil \log_2\left(\sum_{n=1}^{N_{max,SRSres}^{(CB)}} \binom{N_{SRSset,Tx}^{(CB)}}{n} \cdot \left(N_{SRSres}^{(CB)}\right)^n\right) \right\rceil.$$

Figure 2:
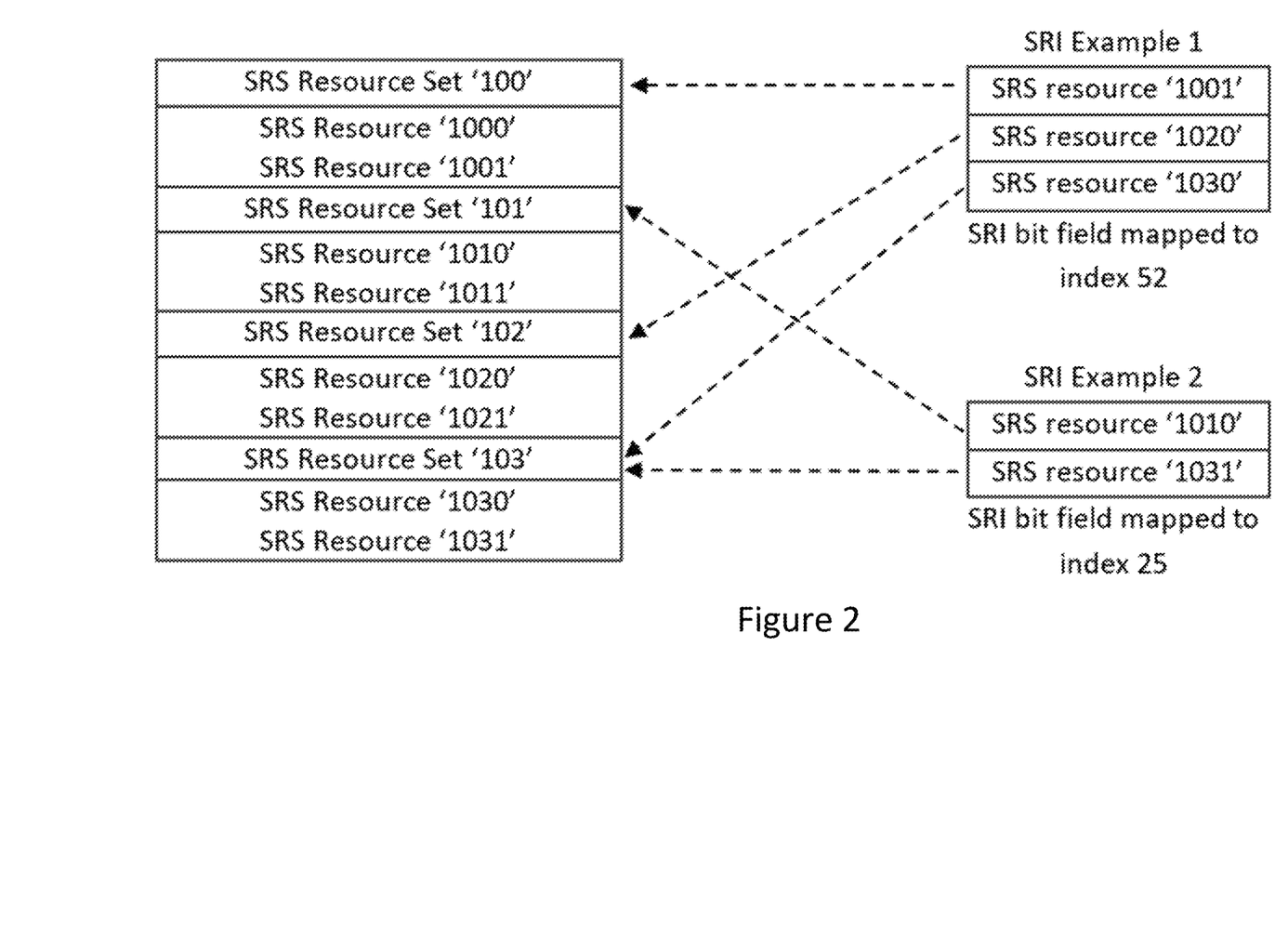
FIG. 2 is an illustration of the indication of SRS resources in the SRI field of the PUSCH-scheduling DCI.

An illustration of the indication of SRS resources in the SRI field of the PUSCH-scheduling DCI is provided in FIG. 2 for four reference SRS resource sets and two SRS resources per set, i.e., $N_{SRSset,Tx}^{(CB)}$ or $N_{SRSset,Tx}^{(NCB)}=4$ and $N_{SRSres}^{(NCB)}$ or $N_{SRSres}^{(NCB)}=2$. In SRI examples 1 and 2, 3 and 2 SRS resources are indicated respectively, each one from a different SRS resource set. The arrows indicate the SRS resource set the indicated SRS resource belongs to. The SRI bit field that shall be used to indicate the chosen set of resources is obtained from Table 6. Each table lists the possible combinations of SRS resources that the gNB may report and the corresponding SRI bit field that shall be used for the same.

FIG. 1 shows a scenario where $N_{SRSset,Tx}^{(CB)}$ or $N_{SRSset,Tx}^{(NCB)}=4$ and $N_{SRSres}^{(NCB)}$ or $N_{SRSres}^{(NCB)}=2$ is illustrated in the figure (refer to Table 6 for SRI bit field mapping for the same). Two examples of SRI indication are shown where each indicated SRS resource is from a different SRS resource set (arrows indicate the SRS resource set the indicate resource is configured in).

In accordance with embodiments, for codebook-based PUSCH transmission, for a DCI indicating $N_{SRSres,ind}^{(CB)}$ SRS resources in the SRI, $N_{SRSres,ind}^{(CB)}$ associated transmitted precoding matrix indicators (TPMIs) are indicated by the DCI, such that the k-th precoding matrix indicated by the k-th TPMI is used to precode the antenna ports (used for PUSCH transmission) associated with the k-th SRS resource indicated by the SRI (k=1, . . . , $N_{SRSres,ind}^{(CB)}$).

In accordance with embodiments, the UE expects to be indicated with TPMI values for PUSCH transmission such that the sum of the transmission rank values of the indicated precoders does not exceed $L_{max}^{(CB)}$.

Figure 3:
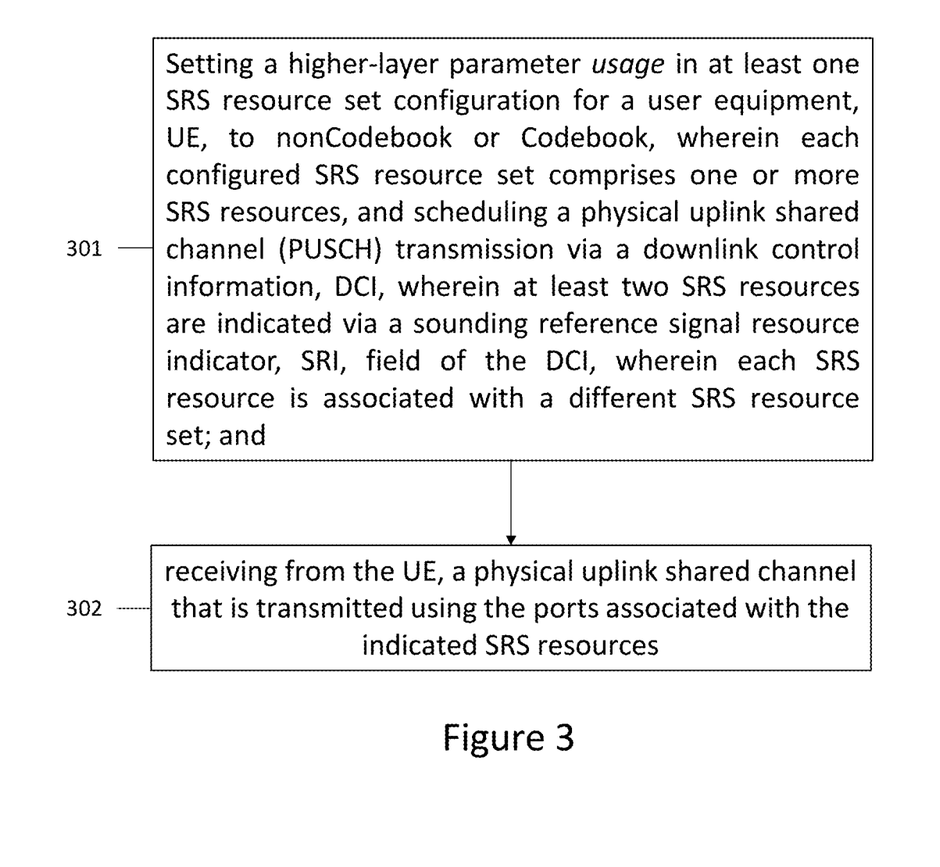
FIG. 3 illustrates a flowchart of a method performed by a network node according to some exemplary embodiments herein.

Referring to FIG. 3, there is illustrated a method performed by a network node according to previously described embodiments. The method comprises (301) setting a higher-layer parameter usage in at least one sounding reference signal, SRS, resource set configuration to nonCodebook or Codebook, wherein each configured SRS resource set comprises one or more SRS resources, and wherein any two SRS resources configured for two different SRS resource sets having the same time domain behavior can be transmitted simultaneously by a user equipment, UE. Hence step (301) comprises configuring at least two SRS resource sets for a UE via the higher layer parameter usage; and the value of the parameter is set to nonCodebook or Codebook. The method further comprises scheduling at least one PUSCH transmission for the UE via a DCI, wherein at least two SRS resources are indicated via the SRI field in the SRI and each SRS resource is associated with a different SRS resource set; and (302) configuring said UE accordingly, so the network node receives from the UE a PUSCH that is transmitted using the ports associated with the indicated SRS resources.

According to an embodiment each configured SRS resource set is associated with the UE's, panel or group of antenna ports or a Tx-Rx RF chain, and wherein the number of configured SRS resource sets is identical to the maximum number of UE panels or antenna ports, or to a subset of said UE panels or antenna ports, or to the maximum number of UE transmission-reception, Tx-Rx, radio frequency chains or to a subset of said Tx-Rx radio frequency, RF, chains.

According to an embodiment the maximum number of SRS resource sets supported by the UE for codebook and non-codebook-based uplink transmission, is a UE capability that is reported to said network node by said UE via a higher-layer message, for e.g., radio resource control, RRC, and wherein the value of the UE capability is equal to the total number of UE panel(s)/group of antenna port(s)/Tx-Rx RF chains or a subset of UE panel(s)/group of antenna port(s)/Tx-Rx RF chains According to an embodiment the UE capability denotes the maximum number of UE panels/Tx-Rx RF chains the UE supports for a particular SRS usage.

According to an embodiment each SRS resource in the SRS resource set configuration with the higher-layer parameter usage set to 'nonCodebook' is configured with only one SRS port.

According to an embodiment each SRS resource indicated in a sounding resource indicator, SRI, field of a physical uplink shared channel, PUSCH-scheduling-downlink control information, DCI, for codebook or non-codebook-based PUSCH transmission is chosen from different SRS resource sets.

According to an embodiment, in the case of aperiodic SRS transmission, the reference SRS resource sets are the SRS resource sets transmitted after the most recent downlink control information, DCI, carrying a SRS request triggering the aperiodic resource sets.

According to an embodiment, in the case of semi-persistent SRS transmission, the reference SRS resource sets for a SRI of the PUSCH-scheduling DCI in transmission slot n are all the semi-persistent SRS resource sets that were not deactivated by a medium access control, MAC, control element command before n-k slots, where k is a constant value.

According to an embodiment, in the case of periodic SRS transmission, the reference SRS resource sets are the periodic SRS resource sets configured by the higher-layer for the BWP, bandwidth-part, associated with the DCI.

According to an embodiment, only the SRS resources that belong to the reference SRS resource set(s) is/are indicated in the SRI field of the PUSCH-scheduling DCI.

According to an embodiment, the method further comprises mapping a given SRI bit field to the SRS resources indicated from associated SRS resources sets. The mapping may be performed using any of tables 1-6 previously described.

The embodiments herein also provide a network node comprising a processor and a memory, said memory containing instructions executable by said processor whereby said network node is operative to perform any of method claims 1-12. Further, there is provided a user equipment comprising a processor and a memory, said memory containing instructions executable by said processor whereby said user equipment is operative to be configured by said network node according to claim 13, and a method performed by a user equipment, the method comprising, receiving a configuration from a network node according to claim 13 and operate according to said received configuration.

There is also provided a computer program comprising instructions which when executed on at least one processor of the network according to claim 13 cause at least said one processor to carry out the method according to anyone of claim 1-12.

There is also provided a carrier containing the computer program, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, Bluetooth, satellite communications, TV broadcasting etc. wherein SRS configuration and indication for codebook and non-codebook based UL transmissions in a network is employed.

REFERENCES

[1] 3GPP TS 38.214, "Physical layer procedures for data (Release 15)," 3rd Generation Partnership Project; Technical Specification Group Radio Access Network, Version 15.4.0, January 2019.
[2] 3GPP TS 38.331, "Radio Resource Control (RRC) protocol specification (Release 15)," 3rd Generation Partnership Project; Technical Specification Group Radio Access Network, Version 15.1.0, March 2018.
[3] 3GPP TS 38.211, "Physical channels and modulation (Release 15)," 3rd Generation Partnership Project; Technical Specification Group Radio Access Network, Version 15.4.0, January 2019.
[4] R1-1901348, "Feature lead summary of Enhancements on Multi-beam Operations," LG Electronics, Taipei, Taiwan, January 2019.

The invention claimed is:

1. A method performed by a network node, the method comprising:
configuring at least two sounding reference signal (SRS) resource sets for a user equipment via a higher layer, wherein each SRS resource set comprises at least one SRS resource, and wherein the higher layer configuration of the SRS comprises a parameter usage and the value of the parameter is set to nonCodebook or Codebook;
scheduling at least one physical uplink shared channel (PUSCH) transmission for said user equipment via a downlink control information (DCI) wherein at least two SRS resources are indicated via a sounding reference signal resource indicator (SRI) field of the DCI, wherein each SRS resource is associated with a different SRS resource set;
mapping a given SRI bit field of the SRI field to the SRS resources indicated from associated SRS resource sets; and
receiving from the user equipment a PUSCH that is transmitted using antenna ports associated with the indicated SRS resources,
wherein, in the case when the usage is set to codebook, the DCI indicates as many transmitted precoding matrix index (TPMI) values as the number of SRS resources indicated via the SRI field of the DCI in which a first TPMI value indicates the precoder for the antenna ports corresponding to a first SRS resource and a second TPMI value indicates the precoder for the antenna ports corresponding to a second SRS resource and so on, and
wherein, in the case when the usage is set to nonCodebook, each SRS resource in the SRS resource set configuration is configured with only one port, and wherein each SRS port has a one-to-one mapping with a demodulation reference signal (DMRS) port and thereby, a transmission layer associated with said PUSCH.

2. The method according to claim 1, wherein the higher-layer parameter is set in said at least SRS resource set configuration to nonCodebook or Codebook, and wherein any two SRS resources configured for two different SRS resource sets, having the same time domain behavior which includes one of the following: aperiodic, semi-persistent or periodic, can be transmitted simultaneously by the user equipment (UE).

3. The method according to claim 1, wherein the maximum number of SRS resource sets supported by the UE for codebook and non-codebook-based uplink transmission, is a UE capability that is reported to said network node by said UE via a higher-layer message, for e.g., radio resource control (RRC) and wherein the value of the UE capability is identical to the number of either all of UE panels/Tx-Rx RF chains, or a subset of UE panels/Tx-Rx RF chains.

4. The method according to claim 1, wherein in the case of aperiodic SRS transmission, reference SRS resource sets are the SRS resource sets transmitted after the most recent downlink control information (DCI) carrying a SRS request triggering the aperiodic resource sets, wherein the reference SRS resource set(s) with respect to an SRI field are defined as the SRS resource set(s) from which the SRS resource(s) are indicated by the SRI field.

5. The method according to claim 1, wherein in the case of semi-persistent SRS transmission, reference SRS resource sets for a SRI of the PUSCH-scheduling DCI in transmission slot n are all the semi-persistent SRS resource sets that were not deactivated by a medium access control (MAC) control element command before n-k slots, where k is a constant value, wherein the reference SRS resource set(s) with respect to an SRI field are defined as the SRS resource set(s) from which the SRS resource(s) are indicated by the SRI field.

6. The method according to claim 1, wherein in the case of periodic SRS transmission, reference SRS resource sets are the periodic SRS resource sets configured by the higher-layer for a (BWP) bandwidth-part, associated with the DCI, wherein the reference SRS resource set(s) with respect to an SRI field are defined as the SRS resource set(s) from which the SRS resource(s) are indicated by the SRI field.

7. The method according to claim 1, wherein, only the SRS resources that belong to reference SRS resource set(s) is/are indicated in the SRI field of the PUSCH-scheduling DCI, wherein the reference SRS resource set(s) with respect to an SRI field are defined as the SRS resource set(s) from which the SRS resource(s) are indicated by the SRI field.

8. The method according to claim 1, wherein said mapping is performed using the following table:

| SRI Bit field mapped to index | SRS resource(s) indicated for NCB ($L_{max}^{(NCB)} = 1$) and CB UL ($N_{max,\,SRSres}^{(CB)} = 1$) | SRI Bit field mapped to index | SRS resource(s) indicated for NCB ($L_{max}^{(NCB)} = 1$) and CB UL ($N_{max,\,SRSres}(CB) = 2$) |
|---|---|---|---|
| 0 | $S_0^0$ | 0 | $S_0^0$ |
| 1 | $S_0^1$ | 1 | $S_0^1$ |
|   |   | 2 | $S_0^0$, $S_0^1$ |
|   |   | 3 | reserved | wherein the notation $s_i^j$ denotes the i-th SRS resource of the j-th reference SRS resource set, wherein $L_{max}^{(NCB)}$ is the value of the UE capability parameter 'maxNumberMIMO-LayersNonCB-PUSCH' defined in 3GPP Rel. 15, and for non-codebook based SRS, the values of i and j are given by i=0, ..., $N_{SRSres}^{(NCB)}-1$ and j=0, ..., $N_{SRSset,Tx}^{(NCB)}-1$, respectively, wherein $N_{SRSset,Tx}^{(NCB)}$ is the number of reference SRS resource sets, wherein for codebook-based SRS, the values of i and j are given by i=0, ..., $N_{SRSres}^{(CB)}-1$ and j=0, ..., $N_{SRSset,Tx}^{(CB)}-1$, respectively, wherein $N_{SRSset,Tx}^{(CB)}$ is the number of reference SRS resource sets.

9. The method according to claim 1, wherein said mapping is performed using the following table:

| SRI Bit field mapped to index | SRS resource(s) indicated for NCB ($L_{max}^{(NCB)} = 1$) and CB UL ($N_{max,\,SRSres}^{(CB)} = 1$) | SRI Bit field mapped to index | SRS resource(s) indicated for NCB ($L_{max}^{(NCB)} = 2$) and CB UL ($N_{max,\,SRSres}^{(CB)} = 2$) |
|---|---|---|---|
| 0 | $S_0^0$ | 0 | $S_0^0$ |
| 1 | $S_1^0$ | 1 | $S_1^0$ |
| 2 | $S_0^1$ | 2 | $S_0^1$ |
| 3 | $S_1^1$ | 3 | $S_1^1$ |
|   |   | 4 | $S_0^0$, $S_0^1$ |
|   |   | 5 | $S_0^0$, $S_1^1$ |
|   |   | 6 | $S_1^0$, $S_0^1$ |
|   |   | 7 | $S_1^0$, $S_1^1$ | wherein the notation $s_i^j$ denotes the i-th SRS resource of the j-th reference SRS resource set, wherein for non-codebook based SRS, the values of i and j are given by i=0, ..., $N_{SRSres}^{(NCB)}-1$ and j=0, ..., $N_{SRSset,Tx}^{(NCB)}-1$, respectively.

wherein the notation $s_i^j$ denotes the i-th SRS resource of the j-th reference SRS resource set, wherein $L_{max}^{(NCB)}$ is the value of the UE capability parameter 'maxNumberMIMO-LayersNonCB-PUSCH' defined in 3GPP Rel. 15, and for non-codebook based SRS, the values of i and j are given by i=0, ..., $N_{SRSres}^{(NCB)}-1$ and j=0, ..., $N_{SRSres,Tx}^{(NCB)}-1$, respectively, wherein $N_{SRSset,Tx}^{(NCB)}$ is the number of reference SRS resource sets, and wherein for codebook-based SRS, the values of i and j are given by i=0, ..., $N_{SRSres}^{(CB)}-1$ and j=0, ..., $N_{SRSres,Tx}^{(CB)}-1$, respectively, wherein $N_{SRSres,Tx}^{(CB)}$ is the number of reference SRS resource sets.

10. The method according to claim 1, wherein said mapping is performed using the following table:

| SRI Bit field mapped to index | SRS resource(s) indicated for NCB ($L_{max}^{(NCB)} = 1$) and CB UL ($N_{max,\,SRSres}^{(CB)} = 1$) | SRI Bit field mapped to index | SRS resource(s) indicated for NCB ($L_{max}^{(NCB)} = 2$) and CB UL ($N_{max,\,SRSres}^{(CB)} = 2$) | SRI Bit field mapped to index | SRS resource(s) indicated for NCB ($L_{max}^{(NCB)} = 3$) and CB UL ($N_{max,\,SRSres}^{(CB)} = 3$) |
|---|---|---|---|---|---|
| 0 | $S_0^0$ | 0 | $S_0^0$ | 0 | $S_0^0$ |
| 1 | $S_0^1$ | 1 | $S_0^1$ | 1 | $S_0^1$ |
| 2 | $S_0^2$ | 2 | $S_0^2$ | 2 | $S_0^2$ |
| 3 | reserved | 3 | $S_0^0$, $S_0^1$ | 3 | $S_0^0$, $S_0^1$ |
|   |   | 4 | $S_0^0$, $S_0^2$ | 4 | $S_0^0$, $S_0^2$ |
|   |   | 5 | $S_0^1$, $S_0^2$ | 5 | $S_0^1$, $S_0^2$ |
|   |   | 6-7 | reserved | 6 | $S_0^0$, $S_0^1$, $S_0^2$ |
|   |   |   |   | 7 | reserved | wherein the notation $s_i^j$ denotes the i-th SRS resource of the j-th reference SRS resource set, wherein $L_{max}^{(NCB)}$ is the value of the UE capability parameter 'maxNumberMIMO-LayersNonCB-PUSCH' defined in 3GPP Rel. 15, and for non-codebook based SRS, the values of i and j are given by i=0, ..., $N_{SRSres}^{(NCB)}-1$ and j=0, ..., $N_{SRSset,Tx}^{(NCB)}-1$, respectively, wherein $N_{SRSset,Tx}^{(NCB)}$ is the number of reference SRS resource sets, wherein for codebook-based SRS, the values of i and j are given by i=0, ..., $N_{SRSres}^{(CB)}-1$ and j=0, ..., $N_{SRSset,Tx}^{(CB)}-1$, respectively, wherein $N_{SRSset,Tx}^{(CB)}$ is the number of reference SRS resource sets.

11. The method according to claim 1, wherein the number of bits of the SRI field required to indicate:

a maximum of $L_{max}^{(NCB)}$ resources from $N_{SRSset,Tx}^{(NCB)}$ non-codebook-based SRS resource sets is $$\left\lceil \log_2\left(\sum_{n=1}^{L_{max}^{(NCB)}} \binom{N_{SRSset,Tx}^{(NCB)}}{n} \cdot \left(N_{SRSres}^{(NCB)}\right)^n\right) \right\rceil,$$

wherein $N_{SRSres}^{(NCB)}$ is the number of SRS resources configured per SRS resource set whose higher-layer parameter usage set to 'nonCodebook'; and a maximum of $N_{max,SRSres}^{(CB)}$ resources from $N_{SRSset,Tx}^{(CB)}$ codebook-based SRS resource sets is $$\left\lceil \log_2 \left( \sum_{n=1}^{N_{max,SRSres}^{(CB)}} \binom{N_{SRSset,Tx}^{(CB)}}{n} \cdot (N_{SRSres}^{(CB)})^n \right) \right\rceil,$$

wherein $N_{SRSres}^{(CB)}$ is the number of SRS resources configured per SRS resource set whose higher-layer parameter usage set to 'codebook'.

12. A network node comprising a processor and a memory, said memory containing instructions executable by said processor whereby said network node is operative to:
configure at least two sounding reference signal (SRS) resource sets for a user equipment via a higher layer, wherein each SRS resource set comprises at least one SRS resource, and wherein the higher layer configuration of the SRS comprises a parameter usage and the value of the parameter is set to nonCodebook or Codebook;
schedule at least one physical uplink shared channel (PUSCH) transmission for said user equipment via a downlink control information (DCI) wherein at least two SRS resources are indicated via a sounding reference signal resource indicator (SRI) field of the DCI, wherein each SRS resource is associated with a different SRS resource set;
map a given SRI bit field of the SRI field to the SRS resources indicated from associated SRS resource sets; and
receive from the user equipment a PUSCH that is transmitted using antenna ports associated with the indicated SRS resources,
wherein, in the case when the usage is set to codebook, the DCI indicates as many transmitted precoding matrix index (TPMI) values as the number of SRS resources indicated via the SRI field of the DCI in which a first TPMI value indicates the precoder for the antenna ports corresponding to a first SRS resource and a second TPMI value indicates the precoder for the antenna ports corresponding to a second SRS resource and so on, and
wherein, in the case when the usage is set to nonCodebook, each SRS resource in the SRS resource set configuration is configured with only one port, and wherein each SRS port has a one-to-one mapping with a demodulation reference signal (DMRS) port and thereby, a transmission layer associated with said PUSCH.

13. A user equipment (UE) comprising a processor and a memory, said memory containing instructions executable by said processor whereby said UE is operative to be configured by a network node, the network node comprising a processor and a memory, said memory containing instructions executable by said processor whereby said network node is operative to:
configure at least two sounding reference signal (SRS) resource sets for the user equipment via a higher layer, wherein each SRS resource set comprises at least one SRS resource, and wherein the higher layer configuration of the SRS comprises a parameter usage and the value of the parameter is set to nonCodebook or Codebook;
schedule at least one physical uplink shared channel (PUSCH) transmission for said user equipment via a downlink control information (DCI) wherein at least two SRS resources are indicated via a sounding reference signal resource indicator (SRI) field of the DCI, wherein each SRS resource is associated with a different SRS resource set;
map a given SRI bit field of the SRI field to the SRS resources indicated from associated SRS resource sets; and
receive from the user equipment a PUSCH that is transmitted using antenna ports associated with the indicated SRS resources,
wherein, in the case when the usage is set to codebook, the DCI indicates as many transmitted precoding matrix index (TPMI) values as the number of SRS resources indicated via the SRI field of the DCI in which a first TPMI value indicates the precoder for the antenna ports corresponding to a first SRS resource and a second TPMI value indicates the precoder for the antenna ports corresponding to a second SRS resource and so on, and
wherein, in the case when the usage is set to nonCodebook, each SRS resource in the SRS resource set configuration is configured with only one port, and wherein each SRS port has a one-to-one mapping with a demodulation reference signal (DMRS) port and thereby, a transmission layer associated with said PUSCH.

14. A method performed by a user equipment (UE), the method comprising:
receiving a configuration from a network node, the configuration comprising:
configuring at least two sounding reference signal (SRS) resource sets for the user equipment via a higher layer, wherein each SRS resource set comprises at least one SRS resource, and wherein the higher layer configuration of the SRS comprises a parameter usage and the value of the parameter is set to nonCodebook or Codebook;
scheduling at least one physical uplink shared channel (PUSCH) transmission for said user equipment via a downlink control information (DCI) wherein at least two SRS resources are indicated via a sounding reference signal resource indicator (SRI) field of the DCI, wherein each SRS resource is associated with a different SRS resource set;
mapping a given SRI bit field of the SRI field to the SRS resources indicated from associated SRS resource sets;
receiving from the user equipment a PUSCH that is transmitted using antenna ports associated with the indicated SRS resources;
wherein, in the case when the usage is set to codebook, the DCI indicates as many transmitted precoding matrix index (TPMI) values as the number of SRS resources indicated via the SRI field of the DCI in which a first TPMI value indicates the precoder for the antenna ports corresponding to a first SRS resource and a second TPMI value indicates the precoder for the antenna ports corresponding to a second SRS resource and so on; and wherein, in the case when the usage is set to non-Codebook, each SRS resource in the SRS resource set configuration is configured with only one port, and wherein each SRS port has a one-to-one mapping with a demodulation reference signal (DMRS) port and thereby, a transmission layer associated with said PUSCH; and operating according to said received configuration.

* * * * *